US012656217B2

(12) United States Patent
Chan et al.

(10) Patent No.: US 12,656,217 B2
(45) Date of Patent: Jun. 16, 2026

(54) INSPECTION OF OPTICAL COMPONENTS IN OPTICAL SYSTEMS

(71) Applicant: VIAVI SOLUTIONS INC., Chandler, AZ (US)

(72) Inventors: Eugene Chan, Ottawa (CA); Joshua Benjamin Julius Philipson, Ottawa (CA)

(73) Assignee: VIAVI SOLUTIONS INC., Chandler, AZ (US)

( * ) Notice: Subject to any disclaimer, the term of this patent is extended or adjusted under 35 U.S.C. 154(b) by 199 days.

(21) Appl. No.: 18/410,758

(22) Filed: Jan. 11, 2024

(65) Prior Publication Data

US 2025/0231081 A1 Jul. 17, 2025

(51) Int. Cl.
| | |
|---|---|
| *G01M 11/02* | (2006.01) |
| *G01N 21/88* | (2006.01) |
| *G02B 21/04* | (2006.01) |
| *G02B 21/24* | (2006.01) |
| *G02B 21/36* | (2006.01) |

(52) U.S. Cl.
CPC ..... *G01M 11/0278* (2013.01); *G01N 21/8851* (2013.01); *G02B 21/04* (2013.01); *G02B 21/241* (2013.01); *G02B 21/361* (2013.01); *G01N 2021/8887* (2013.01)

(58) Field of Classification Search
CPC ........... G01M 11/0278; G01N 21/8851; G01N 2021/8887; G02B 21/04; G02B 21/241; G02B 21/361
See application file for complete search history.

(56) References Cited

U.S. PATENT DOCUMENTS

| | | | |
|---|---|---|---|
| 2010/0290694 A1* | 11/2010 | Dubois ................ | G01N 21/958 382/141 |
| 2013/0278744 A1* | 10/2013 | Debarre ................ | G02B 21/06 348/79 |
| 2020/0249168 A1* | 8/2020 | Voleti ................ | G02B 21/0084 |
| 2022/0276125 A1* | 9/2022 | Ridgeway .......... | G01M 11/0292 |

* cited by examiner

*Primary Examiner* — Jamil Ahmed
(74) *Attorney, Agent, or Firm* — Mannava & Kang, P.C.

(57) ABSTRACT
According to examples, an optical system may include optical components including an objective lens, an imager, and a controller. The controller may cause a first conjugate plane to be formed at a first location within the optical components, in which the imager is to capture an image of the first location at the first conjugate plane, and may receive the captured image of the first location at the first conjugate plane from the imager. The controller may also cause a second conjugate plane to be formed at a second location within the optical components, in which the imager is to capture an image of the second location at the second conjugate plane, and receive the captured image of the second optical component at the conjugate plane from the imager. The controller may inspect the images to determine whether there are any potential issues with the optical components.

20 Claims, 5 Drawing Sheets

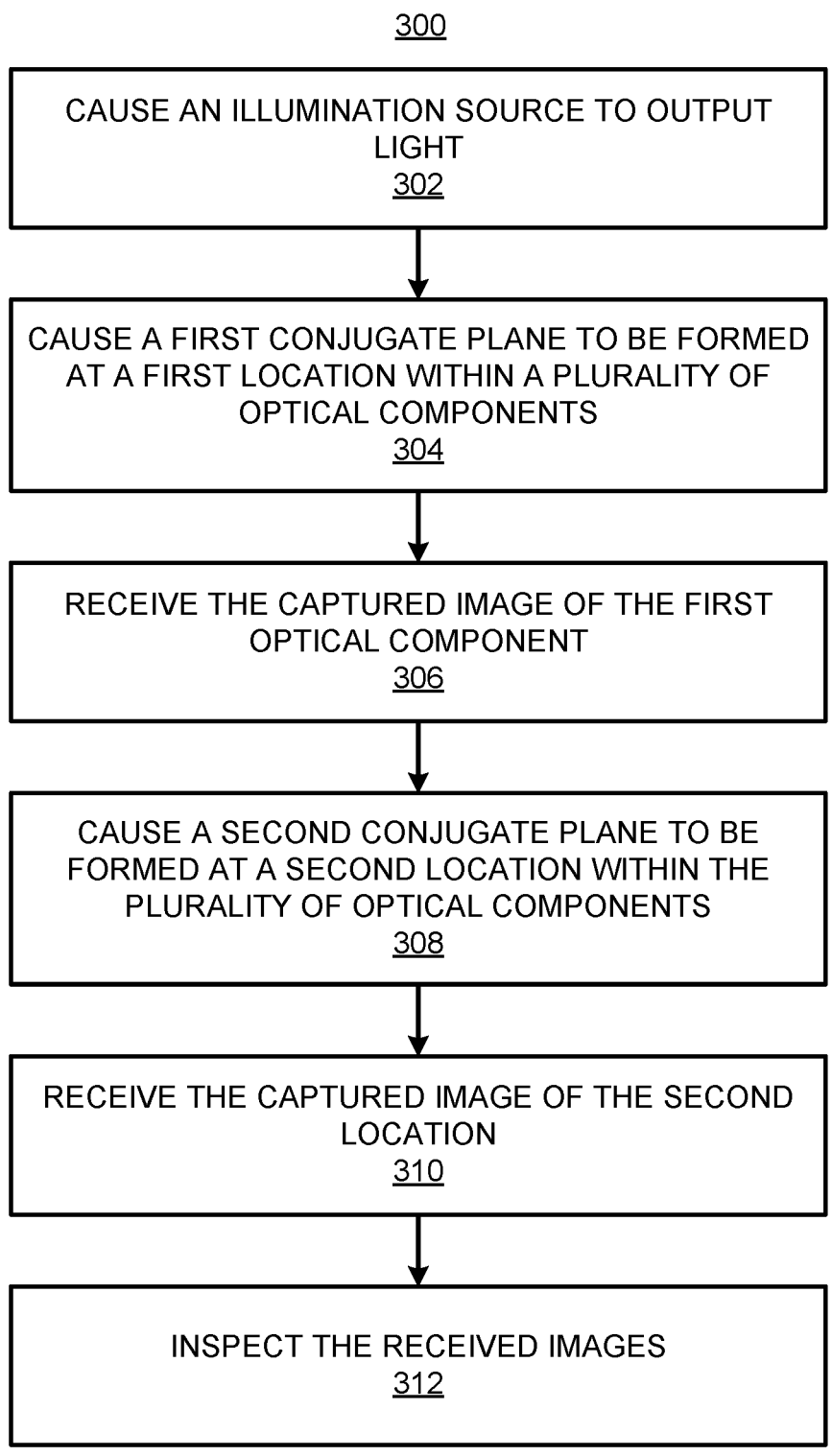

300

CAUSE AN ILLUMINATION SOURCE TO OUTPUT LIGHT
302

CAUSE A FIRST CONJUGATE PLANE TO BE FORMED AT A FIRST LOCATION WITHIN A PLURALITY OF OPTICAL COMPONENTS
304

RECEIVE THE CAPTURED IMAGE OF THE FIRST OPTICAL COMPONENT
306

CAUSE A SECOND CONJUGATE PLANE TO BE FORMED AT A SECOND LOCATION WITHIN THE PLURALITY OF OPTICAL COMPONENTS
308

RECEIVE THE CAPTURED IMAGE OF THE SECOND LOCATION
310

INSPECT THE RECEIVED IMAGES
312

*FIG. 3*

TESTING APPARATUS
400

IMAGER
108

CONTROLLER
104

DATA
STORE
404

ACTUATOR
150

MEMORY
402

CAUSE AN ILLUMINATION SOURCE TO
OUTPUT LIGHT
410

CAUSE A CONJUGATE PLANE TO BE
MOVED AMONG MULTIPLE LOCATIONS
WITHIN OPTICAL COMPONENTS
412

RECEIVE THE IMAGES OF SURFACES
OF THE FIRST OPTICAL COMPONENTS
414

INSPECT THE IMAGES
416

OUTPUT RESULTS OF THE
INSPECTION
418

500

CAUSE AN ILLUMINATION SOURCE TO OUTPUT
LIGHT
502

CAUSE A CONJUGATE PLANE TO BE MOVED AMONG
MULTIPLE LOCATIONS WITHIN OPTICAL
COMPONENTS
504

RECEIVE THE IMAGES OF THE MULTIPLE
LOCATIONS
506

INSPECT THE IMAGES
508

OUTPUT RESULTS OF THE INSPECTION
510

INSPECTION OF OPTICAL COMPONENTS IN OPTICAL SYSTEMS

TECHNICAL FIELD

The disclosure relates generally to optical systems. Particularly, the disclosure relates to techniques for inspecting optical components housed within the optical systems. More particularly, the disclosure relates to inspecting images of the optical components to determine whether the optical components have potential issues.

BACKGROUND

Optical systems, such as microscopes, are often used to inspect surfaces of various types of objects. For instance, microscopes are often employed in the inspection of optical fibers, and more particularly, the terminating ends of optical fibers. The microscopes may be employed to determine the quality and cleanliness of the terminating ends as these represent important factors in the performance of the optical fibers in optical communications. The quality and cleanliness of the microscopes are also important factors in inspecting the terminating ends of the optical fibers as defects and debris in or on the external and internal optical components of the microscopes may affect the precision at which the terminating ends may be inspected.

BRIEF DESCRIPTION OF THE DRAWINGS

Features of the present disclosure may be illustrated by way of example and not limited in the following figure(s), in which like numerals indicate like elements, in which:

FIG. 3 illustrates a flow diagram of a method for inspecting optical components of an optical system, according to an example of the present disclosure;

DETAILED DESCRIPTION

Figure 1:
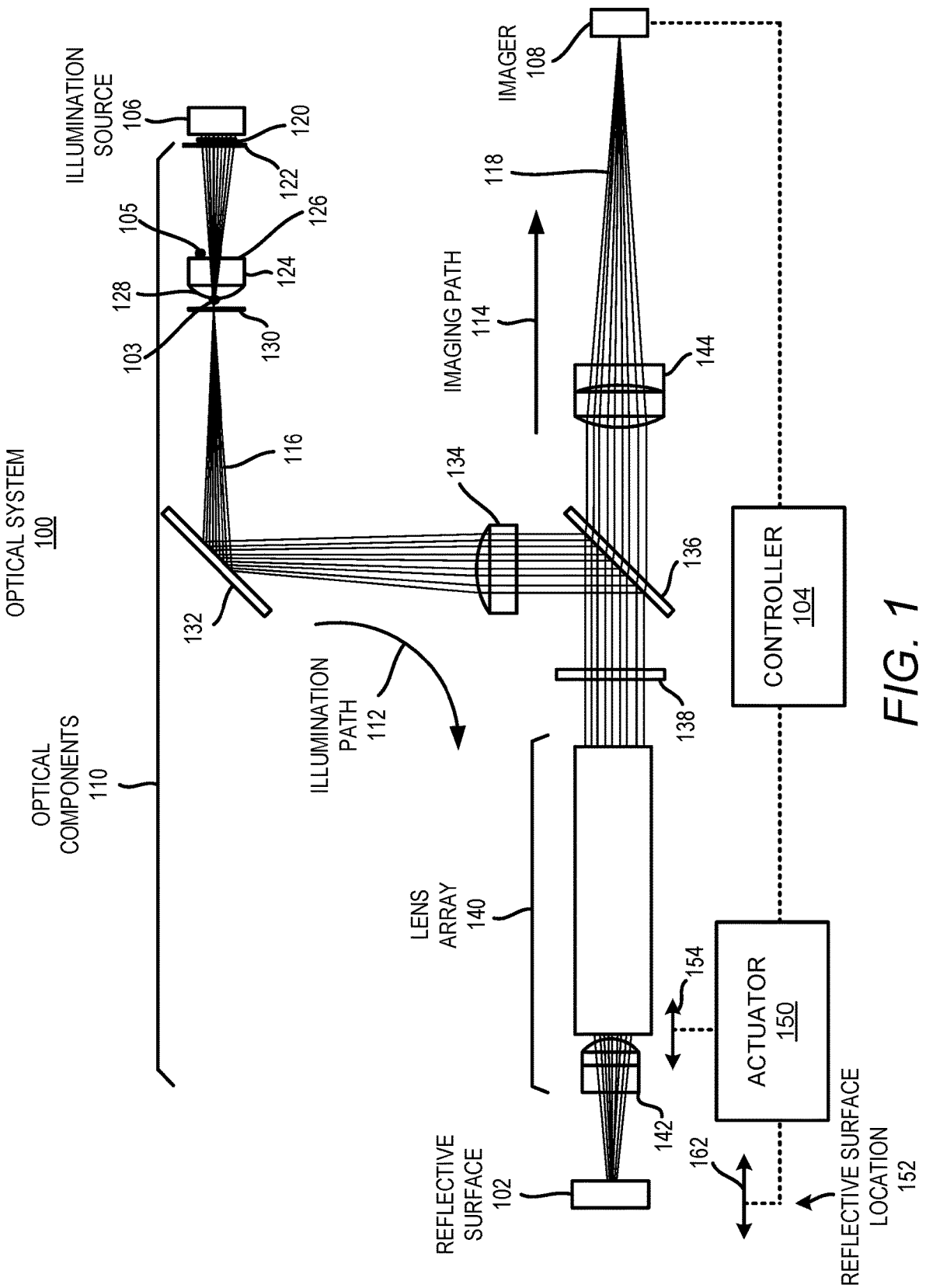
FIG. 1 illustrates an optical system, which may also be termed a testing system, that may capture images of a device under test (DUT) and may also inspect optical components of the optical system, according to an example of the present disclosure.

In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the description of the present disclosure. Also, for simplicity and illustrative purposes, the present disclosure is described below by referring mainly to examples. As used herein, the terms "a" and "an" are intended to denote at least one of a particular element, the term "includes" means includes but not limited to, the term "including"

means including but not limited to, and the term "based on" means based at least in part on.

In microscopy, cleanliness and quality of optical components both inside and outside of the microscopes is paramount to producing high-quality uncompromised images. During assembly, optics and mechanics are typically cleaned and installed. The optics and mechanics are also inspected, typically under a different microscope and then installed into the microscope. However, particulates may, over time, accumulate internally within the microscope, which may substantially degrade images produced by the microscope. Other factors may also substantially degrade the images, such as scratches, markings, defects, that may not have been identified during the pre-assembly inspection of the optics and mechanics of the microscope. The existence of the particulates or other defects may not be identified until the degradation in the images is noticed at which point the microscope may be sent to a technician to be serviced.

To perform a cleaning operation, the microscope may be disassembled and pressurized air may be blown on the surfaces of the optics and mechanics. However, blowing pressurized air over the surfaces may not result in an issue being resolved and thus, following such an operation, the microscope may be reassembled and another image may be produced to determine whether the issue still exists. This trial-and-error approach may be time consuming and laborious and may not result in the identification of the location of the issue and thus, may not result in solving the issue. Another approach may be to disassemble the microscope and inspect and clean each of the components. While this approach may solve the issue, this approach may also be time consuming and laborious as many components that may not have any issues may be inspected and cleaned unnecessarily.

According to examples of the present disclosure, some or all of the optical components within an optical system, such as a microscope, may be inspected. Particularly, the optical components may be inspected without requiring that the optical system be disassembled to individually inspect the optical components. Instead, as disclosed herein, an external reflective surface, such as a curved reflective surface, may be employed with the optical system to induce an internal scan of imaging conjugates. That is, by varying one or more settings with respect to the imaging of the external reflective surface, various internal surfaces (conjugate planes) of the optical system will be in focus of an imager. The settings may be distances between the optical system and the reflective surface, the focal length of an optical lens, the radius of curvature of the reflective surface, and/or the like. The images may be inspected to determine whether any of the internal surfaces, e.g., the optical components, have any issues, e.g., dust particles, markings, scratches, etc.

Through implementation of the features of the present disclosure, the internal optical components of an optical system may be inspected for potential issues without disassembling the optical system. In addition, specific ones of the optical components that may have potential issues may be identified such that, for instance, a technician may be notified of those specific optical components. The technician may then target cleaning and/or replacement of specific optical components. As a result, issues with the optical components in the optical system may be resolved in a quick and efficient manner and a duration at which the optical system may be out of commission may significantly be reduced. In addition, the optical system itself may be employed to inspect the optical components of the optical system, which may reduce the need for other inspection systems.

With reference first to FIG. 1, there is illustrated an optical system 100, which may also be termed a testing system 100, that may capture images of a device under test (DUT), according to an example of the present disclosure. In addition, the optical system 100 may inspect optical components 110 of the optical system 100 for potential issues that may affect the performance quality of the optical system 100. The potential issues may include debris, defects (such as scratches, markings, manufacturing errors, etc.), and/or the like. For instance, the optical system 100 may include a controller 104 that may inspect images of some or all of the optical components 110 in the optical system 100 for the potential issues. It should be understood that the optical system 100 may include additional features and that some of the features described herein may be removed and/or modified without departing from a scope of the optical system 100. In addition, although the optical system 100 has been depicted as having a certain arrangement of optical components 110, it should be understood that the optical components 110 may be positioned in other arrangements without departing from a scope of the optical system 100.

As shown, the optical system 100 may include an illumination source 106 and an imager 108. The optical system 100 may also include optical components 110 positioned between the illumination source 106 and the imager 108. The optical components 110 may be positioned to direct light rays emitted from the illumination source 106 toward a reflective surface 102 along an illumination path 112 and light rays reflected from the reflective surface 102 to the imager 108 along an imaging path 114. The light rays emitted from the illumination source 106 are denoted with reference numeral 116 and the light rays reflected from the reflective surface 102 are denoted with reference numeral 118. According to examples, the optical system 100 may include a microscope or other type of optical imaging device that may be used to inspect a DUT. In some examples, the optical system 100 may be an infinite conjugate optical system, while in other examples, the optical system 100 may be a finite conjugate optical system.

According to examples, the reflective surface 102 may be a mirror or other type of surface that may reflect most or all of the light directed onto the reflective surface 102. The reflective surface 102 may have a relatively flat or planar configuration such that, for instance, light rays impinging on the reflective surface 102 may be reflected at or nearly at 180 degrees from the angle in which the light rays impinge on the reflective surface 102. In other examples, the reflective surface 102 may have a curved shape such that light rays impinging the reflective surface 102 may be reflected at a number of impingement angles. In some examples, the reflective surface 102 may be positioned to reflect light rays back into the optical components 110 during inspection of a DUT. In these examples, the reflective surface 102 may be removed and the DUT may be positioned in place of the reflective surface 102 to inspect the DUT. In some examples, the reflective surface 102 may be part of a DUT, e.g., a terminating end of an optical fiber or other type of DUT.

The illumination source 106 may be any suitable type of illumination device for an optical system, such as a light emitting diode (LED), an incandescent lamp (such as a tungsten lamp), a halogen lamp, an arc lamp, and/or the like. The illumination source 106 may emit light rays 116 toward the optical components 110 along the illumination path 112. Particularly, the optical components 110 along the illumination path 112 may include a diffuser 120, which may scatter light emitted therethrough to make the light softer and spread out uniformly over an area. The optical components 110 along the illumination path 112 may also include an aperture stop (AS) 122, which may limit the marginal limiting rays through the system 100. The optical components 110 along the illumination path 112 may further include a collector (or collector lens) 124, which may include a planar side 126 and a spherical side 128. The collector 124 may concentrate the light rays 116 that pass through a field stop 130, which may limit the field of view of the optical system 100.

The light rays 116 may be directed to an illumination fold mirror 132 that may reflect and redirect the light rays 116 to a field lens (FIE) 134, which may shape and direct light onto the reflective surface 102, e.g., may present the image of the illumination source 106 to a lens array 140. The FIE 134 may enhance the light rays 116, which are directed onto a beam splitter 136, which may reflect and redirect the light rays toward a window 138 and the lens array 140. The lens array 140 may include a microscope objective lens 142, which is also recited herein as an objective lens 142. The lens array 140 may include a number of lenses that may focus the light rays 116 onto a surface of the reflective surface 102. Some of the light rays 118 that are reflected from the surface of the reflective surface 102 may be directed back toward the objective lens 142, the lens array 140, and through the window 138. Additionally, the beam splitter 136 may allow the light rays 118 along the imaging path 114 to pass through the beam splitter 136 as shown in FIG. 1. The light rays 118 may also pass through a tube lens (TL) 144, which may focus the light rays 118 onto the imager 108.

The imager 108 may be an electronic device, e.g., a sensor, that may convert incoming light into digital signals. The imager 108 may communicate the digital signals to the controller 104, which may process the digital signals to generate digital images. According to examples, the optical system 100 may include an actuator 150 that the controller 104 may control. In some examples, the actuator 150 may vary the relative position of the lens array 140, and particularly, the objective lens 142, with respect to a location 152 of the reflective surface 102. The reflective surface location 152 may be a location at which the reflective surface 102 is positioned during performance of an inspection operation of the optical components 110. The controller 104 may cause the actuator 150 to change the relative position of the lens array 140 with respect to the reflective surface location 152 as denoted by the arrow 154 to vary the focus on the reflective surface 102. For instance, the controller 104 may perform an autofocus operation using the actuator 150.

In other examples, the lens array 140 and/or the objective lens 142 may include an optical lens having a focal length that may be tuned electronically. The optical lens may be, for instance, a liquid lens, and the controller 104 may vary the focal length of the optical lens such as by electronically shaping the focal length.

In addition, or alternatively, the actuator 150 may be connected to or may otherwise move the reflective surface 102 and/or a DUT holder (not shown). The DUT holder may include an opening into which a DUT may be inserted and held during testing of the DUT. In these examples, the controller 104 may control the actuator 150 to move the reflective surface 102 (or the DUT holder) and thus, the reflective surface location 152, as denoted by the arrow 162. Again, the controller 104 may cause the actuator 150 to move the reflective surface 102 such that the reflective surface 102 (or a DUT) may be in focus and a clear image of the reflective surface 102 (or the DUT) may be captured for analysis.

As further examples, the actuator 150 may cause the radius of curvature of the reflective surface 102 to be changed. For instance, the actuator 150 may have access to a plurality of reflective surfaces 102 having different radii of curvatures with respect to each other. In these examples, the actuator 150 may place selected ones of the reflective surfaces 102 to be imaged through the objective lens 142. In other examples, the reflective surface 102 may be deformable such that the reflective surface 102 may have any of a number of radii of curvatures and the actuator 150 may vary the radius of curvature of the reflective surface 102.

As also discussed herein, the controller 104 may vary a setting, e.g., the distance between the reflective surface 102 and the objective lens 142, the electronically adjustable focal length of the objective lens 142, the radius of curvature of the reflective surface 102, or the like, in order to change locations of conjugate planes within the optical system 100 that are in focus of the imager 108. That is, for instance, when the reflective surface 102 is at a first distance from the objective lens 142, a first conjugate plane, which may include an object 103 on a surface of an optical component (such as the optical component 124), may be in focus of the imager 108. Additionally, when the reflective surface 102 is at a second distance from the objective lens 142, a second conjugate plane, which may include an object 105, may be in focus of the imager 108. The location of the conjugate plane may similarly be formed and moved when the focal length of the objective lens 142 and/or the radius of curvature of the reflective surface 102 have been changed.

Generally speaking, the optical components 110 may include multiple conjugate planes, which refer to the concept of planes that have internal intermediate images. In other words, the optical components 110 may construct more than one image, e.g., images may be relayed multiple times through the optical components 110, and each plane that has such an internal image is considered conjugated to the object. Conjugate planes may be defined as planes in the optical components 110 that have object-image relationships with the object. In other words, conjugates of an optical system may be defined as the object presented to the optical components 110, and the image that is produced, i.e., conjugates may be the object presented to the lensing system and the image that is produced.

As shown in FIG. 1, the multiple conjugate planes may include, for instance, when the reflective surface 102 and the optical system are in a first setting (e.g., distance, radius of curvature, etc.), a first conjugate plane formed at a first surface 128 of the optical component 124, a second conjugate plane formed at the reflective surface 102, and a third conjugate plane formed at the imager 108. In one regard, this means that images of the first surface 128 and the reflective surface 102 may be propagated through the optical components 110 such that the images are in focus at the imager 108. Assuming that the reflective surface 102 is a mirror that does not include visible or noticeable imperfections, any imperfections contained in an image captured by the imager 108 may be identified as being located on the first surface 128.

As a result, any object that occludes (dust), colors, partially-transmits (e.g., a scratch) at one intermediate image plane in the optical components 110 will be overlapped at every subsequent imaging conjugate plane in the optical components 110. In other words, an image of an object, such as a surface of the collector 124 may be overlapped at every subsequent imaging conjugate plane in the optical components 110, including the conjugate plane at the imager 108. In this manner, an image of the object (e.g., which may be on the surface of the collector 124) may be in focus of the imager 108 when the reflective surface 102 is at a certain distance, e.g., focal distance, with respect to the objective lens 142. Likewise, the image of the object may be in focus of the imager 108 when the reflective surface 102 has a certain radius of curvature and/or the objective lens has a certain focal length.

In still other words, the image created by one optical component (e.g., the surface of the collector 124) may serve as the object for another optical component as the image is relayed through the optical components, which means that an object may repeatedly be imaged and any plane that creates such an intermediate image all have the conjugate-relationship. Thus, for instance, an object on one of the optical components 110, on a surface of one of the optical components 110, or a surface of one of the optical components 110 itself, may have conjugate images constructed at conjugate planes, in which one of the conjugate planes is in focus at the imager 108. The focus level of the conjugate image of the object on the imager 108 may be dependent on the position of the reflective surface 102 with respect to the objective lens. As a result, the focus level of the conjugate image of the object on the imager 108 may be changed by changing the relative position of the reflective surface 102 and the objective lens 142 of the optical components 110. In addition, the object, e.g., the optical component 110, the surface of the optical component 110, an interior of the optical component 110, or the like, for which conjugate images are constructed in the optical components 110 and the imager 108 may be varied by changing the distance between the reflective surface 102 and the objective lens 142. The object, e.g., the locations of the conjugate planes, may also be varied by changing the radius of curvature of the reflective surface 102.

According to examples, the controller 104 may cause the reflective surface 102 to be scanned forward and backwards with respect to the objective lens 142, or vice versa, which may cause focus levels of the conjugate planes on the imager 108 to change. In other words, changing the distance between the reflective surface 102 and the objective lens 142 may cause internal conjugate planes to come into and out of focus on the imager 108. By measuring and noting the reflective surface 102 locations where the one or more internal conjugate planes come into focus, the controller 104 may infer which of the optical components 110 is currently in focus of the imager 108. In other words, the controller 104 may determine the location and/or identification of an optical component 110 whose image is in focus of the imager 108 based on correlations between the distance between the reflective surface 102 and the objective lens 142 at which the image of the optical component 110 is in focus.

The correlations between the locations and/or identifications of the optical components 110 and the distances between the reflective surface 102 and the objective lens 142 may be determined and stored, for instance in a look-up table. For instance, the correlations may be determined through testing such as by adding distinctive marks onto each of the optical components 110 that are to be tested and determining the respective distances between the reflective surface 102 and the objective lens 142 at which the distinctive marks are in focus of the imager 108.

Likewise, correlations between the locations and/or identifications of the optical components 110 and the radius of curvatures of the reflective surface 102 (and/or the focal lengths of the objective lens 142) may be determined and stored, for instance in a look-up table. For instance, the correlations may be determined through testing such as by adding distinctive marks onto each of the optical components 110 that are to be tested and determining the respective radii of curvatures (and/or the focal lengths of the objective lens 142) at which the distinctive marks are in focus of the imager 108.

Figure 2:
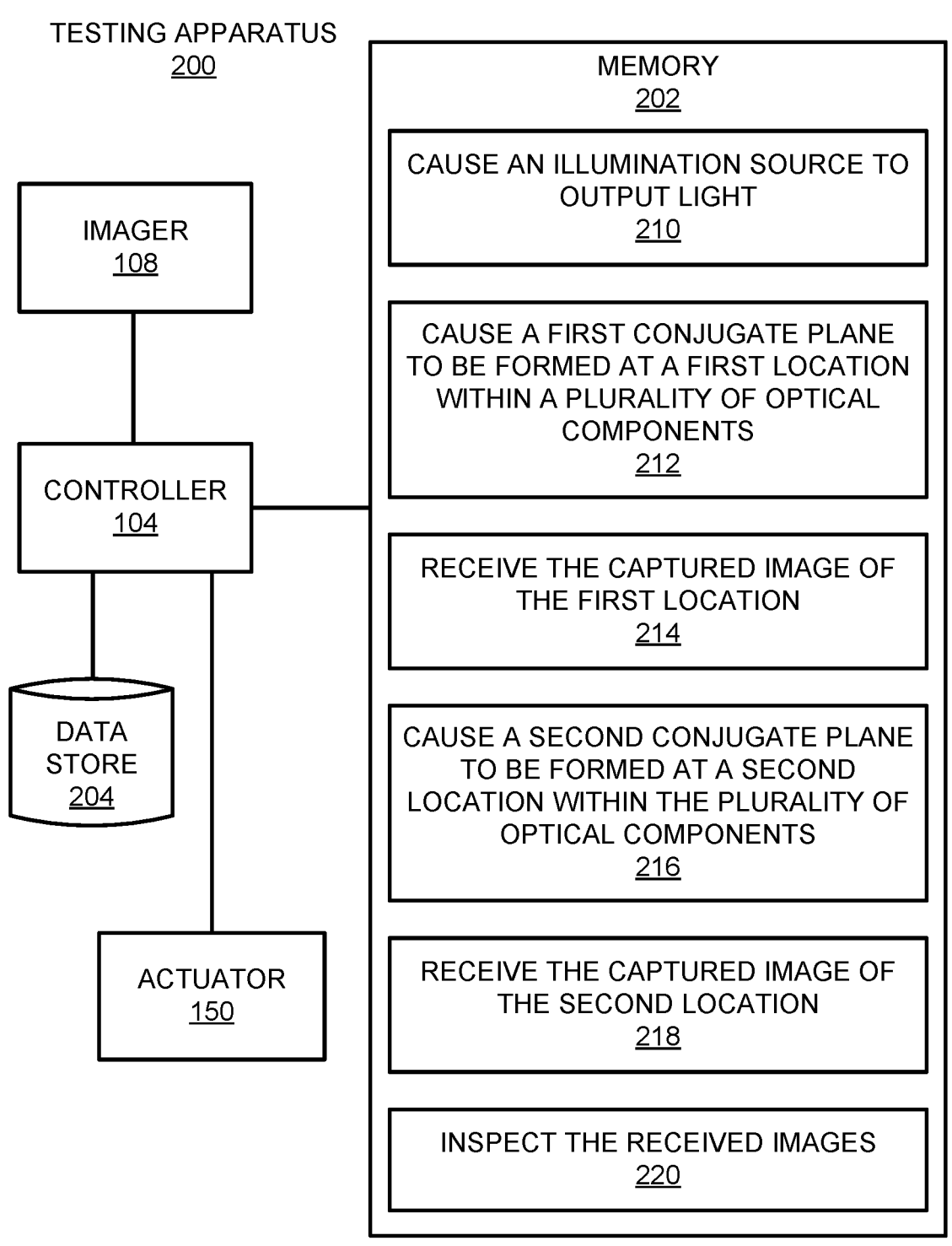
FIG. 2 shows a block diagram of a testing apparatus for inspecting a device under test (DUT), in accordance with an example of the present disclosure.

FIG. 2 shows a block diagram of a testing apparatus 200 for inspecting a device under test (DUT), in accordance with an example of the present disclosure. It should be understood that the testing apparatus 200 may include additional elements and that some of the elements described herein may be removed and/or modified without departing from a scope of the testing apparatus 200. The description of the testing apparatus 200 is made with reference to the features shown in FIG. 1 for purposes of illustration and not of limitation.

As shown in FIG. 2, the testing apparatus 200 may include the controller 104, the imager 108, and the actuator 150 depicted in FIG. 1. In some examples, the testing apparatus 200 may be equivalent to and may include all of the features of the optical system 100 depicted in FIG. 1. The testing apparatus 200 may also include a memory 202 on which instructions that the controller 104 may access and/or execute are stored. In addition, the testing apparatus 200 may include a data store 204 on which the controller 104 may store various information. In some examples, the controller 104, the memory 202, and the data store 204 may be components of a computing device, such as a laptop computer, a server computer, a desktop computer, a tablet computer, and/or the like. In other examples, the controller 104, the memory 202, and the data store 204 may be components of the optical system 100 depicted in FIG. 1.

The controller 104 may be a semiconductor-based microprocessor, a central processing unit (CPU), an application specific integrated circuit (ASIC), a field-programmable gate array (FPGA), and/or other hardware device. The memory 202, which may also be termed a computer readable medium, is, for example, a Random Access memory (RAM), an Electrically Erasable Programmable Read-Only Memory (EEPROM), a storage device, or the like. In some examples, the memory 202 is a non-transitory computer readable storage medium, where the term "non-transitory" does not encompass transitory propagating signals. In any regard, the memory 202 has stored thereon machine-readable instructions that the controller 104 executes. The data store 204 may also be a Random Access memory (RAM), an Electrically Erasable Programmable Read-Only Memory (EEPROM), a storage device, or the like.

Although the testing apparatus 200 is depicted as having a single controller 104, it should be understood that the testing apparatus 200 may include additional processors and/or cores without departing from a scope of the testing apparatus 200. In this regard, references to a single controller 104 as well as to a single memory 202 may be understood to additionally or alternatively pertain to multiple controllers 104 and/or multiple memories 202. In addition, or alternatively, the controller 104 and the memory 202 may be integrated into a single component, e.g., an integrated circuit on which both the controller 104 and the memory 202 may be provided. In addition, or alternatively, the operations described herein as being performed by the controller 104 are distributed across multiple controllers 104.

As shown in FIG. 2, the memory 202 has stored thereon machine-readable instructions 210-220 that the controller 104 is to execute. Although the instructions 210-220 are described herein as being stored on the memory 202 and thus include a set of machine-readable instructions, the testing apparatus 200 may include hardware logic blocks that may perform functions similar to the instructions 210-220. For instance, the controller 104 may include hardware components that may execute the instructions 210-220. In other examples, the testing apparatus 200 may include a combination of instructions and hardware logic blocks to implement or execute functions corresponding to the instructions 210-220. In any of these examples, the controller 104 may implement the hardware logic blocks and/or execute the instructions 210-220. As discussed herein, the testing apparatus 200 may also include additional instructions and/or hardware logic blocks such that the controller 104 may execute operations in addition to or in place of those discussed above with respect to FIG. 2.

The controller 104 may execute the instructions 210 to cause the illumination source 106 to output light through some of the optical components 110 and the objective lens 142 to the reflective surface 102. Light impinging on the reflective surface 102 may be reflected back through the objective lens 142 and some of the optical components 110 to the imager 108. As discussed herein, the reflective surface 102 may be relatively flat or may have a curved surface. In particular examples, the reflective surface 102 has a certain radius of curvature.

The controller 104 may execute the instructions 212 to cause a first conjugate plane to be formed at a first location within the optical components 110. For instance, the controller 104 may cause the optical system 100 and/or the reflective surface 102 to be at a first setting in which the first conjugate plane is formed at the first location. As discussed herein, the first setting may include a setting in which the reflective surface 102 is at a first distance from the objective lens 142, a setting in which the reflective surface 102 has a first radius of curvature, a setting in which the objective lens 142 has a first focal length, and/or the like. As also discussed herein, while under the first setting, a first conjugate plane may be formed at a first location and the first conjugate plane may be propagated through the optical system 100. In other words, a first conjugate plane may be in focus of the imager 108 such that the imager 108 may capture an image of the first conjugate plane. As an example, the first conjugate plane may be formed on a first surface 128 of an optical component 124 and may be in focus of the imager 108.

The controller 104 may also cause the imager 108 to capture an image of the first location at the first conjugate plane. The first location may correspond to a first optical component and particularly, to a front surface, a back surface, or an interior of the first optical component.

As discussed herein, in some examples, the controller 104 may control the actuator 150 to vary the distance between the objective lens 142 and the reflective surface 102 such that the optical components 110 and/or the reflective surface 102 are at the first setting. The actuator 150 may move the objective lens 142 in an autofocus operation to move the objective lens 142 with respect to the reflective surface 102 or may move the optical system 100 with respect to the reflective surface 102. In addition, or alternatively, the actuator 150 may move the reflective surface 102 with respect to the objective lens 142. In other examples, the controller 104 may change the focal length of the objective lens 142 (which may be a liquid lens) and/or the radius of curvature of the reflective surface 102.

The controller 104 may execute the instructions 214 to receive the captured image of the first location at the first conjugate plane from the imager 108. The controller 104 may store the received image in the data store 204.

The controller 104 may execute the instructions 216 to cause a second conjugate plane to be formed at a second location within the optical components 110. For instance, the controller 104 may cause the optical system 100 and/or the reflective surface 102 to be at a second setting in which the second conjugate plane is formed at the second location. The second conjugate plane may be formed by moving the first conjugate plane as may occur by changing the setting of the reflective surface 102 and/or the optical components 110 to the second setting. In other words, the second conjugate plane may be in focus of the imager 108 such that the imager 108 may capture an image of the second conjugate plane. As an example, the second conjugate plane may be formed on a second surface 126 of the first optical component 124 and may be in focus of the imager 108. As another example, the second conjugate plane may be formed on a surface of a second optical component 122 of the optical components 110.

The controller 104 may execute the instructions 218 to receive the captured image of the second location at the second conjugate plane from the imager 108. The controller 104 may store the received image in the data store 204.

The controller 104 may execute the instructions 220 to inspect the received images of the first location and the second location. Particularly, the controller 104 may inspect the image of the first location to identify potential issues with the first optical component and inspect the image of the second location to identify potential issues with the first optical component (a second surface) or a second optical component. The potential issues may include, for instance, debris, scratches, defects, markings, etc. In addition, the controller 104 may inspect the images to determine whether the optical component(s) include issues that are of at least a certain number and/or size. In these instances, the controller 104 may output an indication that certain ones of the optical components 110 may have issues and may require cleaning or replacement based on the optical components 110 having defects of at least certain sizes or having at least a certain number of defects.

According to examples, the controller 104 may determine, based on the first setting, an identity or a placement of the first location. The placement of the first location may correspond to a location within the optical components 110 of the optical system 100. The controller 104 may also determine, based on the second setting, an identity or a placement of the second location. In some examples, the controller 104 may determine the identities and/or placements of the locations by accessing correlations among distances between the objective lens 142 and the reflective surface 102 and identities or placements of the plurality of optical components 110 within the optical system 100. In other examples, the controller 104 may determine the identities and/or placements of the locations by accessing correlations among radii of curvatures of the reflective surface 102 (and/or focal lengths of the objective lens 142) and identities or placements of the plurality of optical components 110 within the optical system 100.

Various manners in which the controller 104 may operate are discussed in greater detail with respect to the method 300 depicted in FIG. 3. Particularly, FIG. 3 illustrates a flow diagram of a method 300 for inspecting optical components 110 of an optical system 100, according to an example of the present disclosure. It should be understood that the method 300 may include additional operations and that some of the operations described therein may be removed and/or modified without departing from the scope of the method 300.

The description of the method 300 is made with reference to the features depicted in FIGS. 1 and 2 for purposes of illustration.

At block 302, the controller 104 may cause the illumination source 106 to output light through some of the optical components 110 and the objective lens 142 to the reflective surface 102. Light impinging on the reflective surface 102 may be reflected back through the objective lens 142 and some of the optical components 110 to the imager 108.

At block 304, the controller 104 may cause a first conjugate plane to be formed at a first location within the optical components 110. For instance, the controller 104 may cause the optical system 100 and/or the reflective surface 102 to be at a first setting in which the first conjugate plane is formed at the first location. As discussed herein, while at the first setting, the first conjugate plane may be formed on a first surface 128 of an optical component 124 and may be in focus of the imager 108.

At block 306, the controller 104 may receive the captured image of the first location at the conjugate plane from the imager 108. The controller 104 may store the received image in the data store 204.

At block 308, the controller 104 may cause a second conjugate plane to be formed at a second location within the optical components 110. For instance, the controller 104 may cause the optical system 100 and/or the reflective surface 102 to be at a second setting in which the second conjugate plane is formed at the second location. As discussed herein, while at the second setting, the second conjugate plane may be in focus of the imager 108 such that the imager 108 may capture an image of the second conjugate plane.

At block 310, the controller 104 may receive the captured image of the second location at the second conjugate plane from the imager 108. The controller 104 may also store the received image in the data store 204.

At block 312, the controller 104 may inspect the received images of the first location and the second location to identify potential issues with at least one optical component in the optical system 100.

Figure 4:
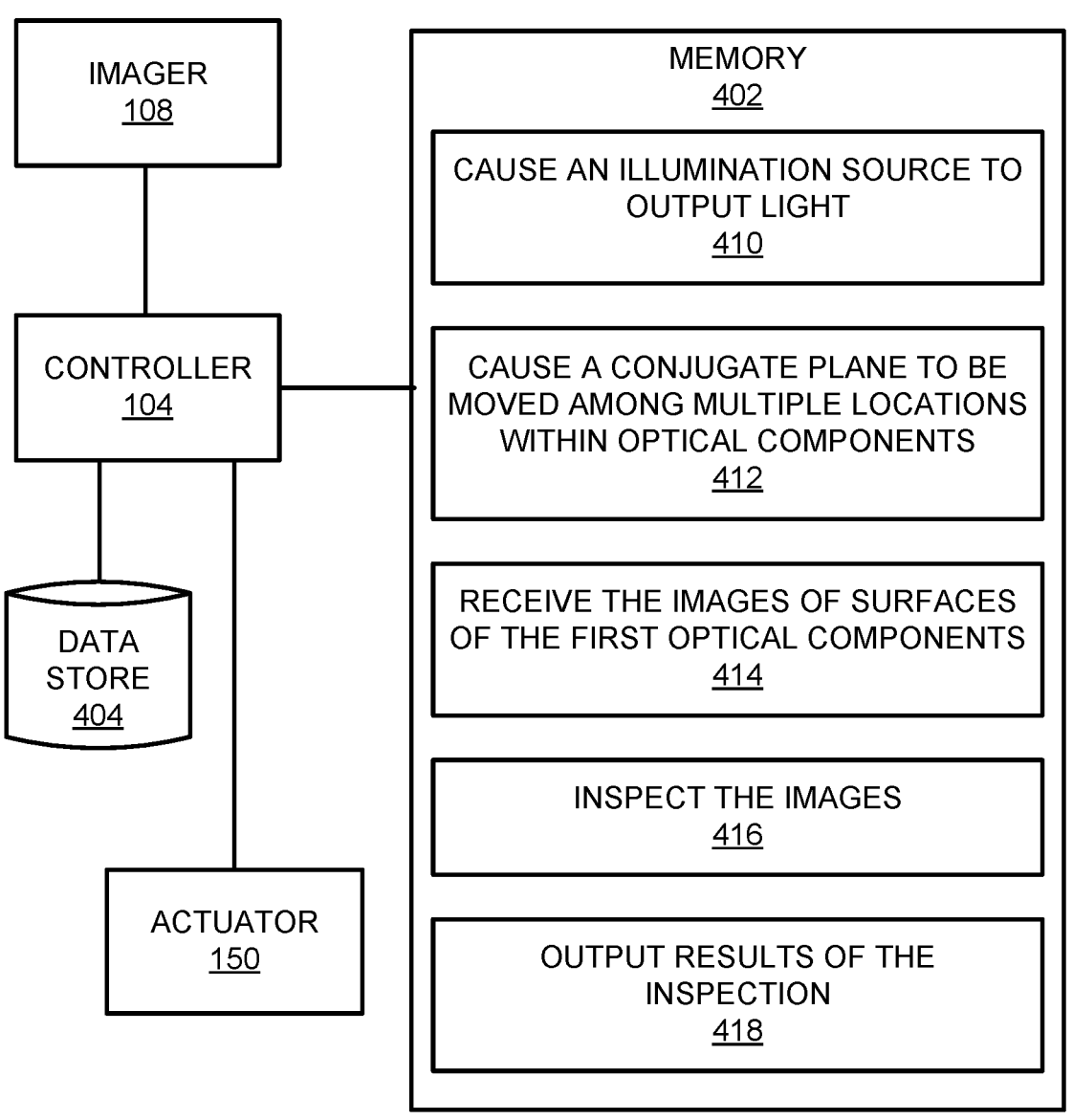
FIG. 4 shows a block diagram of a testing apparatus for inspecting a device under test (DUT), in accordance with an example of the present disclosure.

FIG. 4 shows a block diagram of a testing apparatus 400 for inspecting a device under test (DUT), in accordance with an example of the present disclosure. It should be understood that the testing apparatus 400 may include additional elements and that some of the elements described herein may be removed and/or modified without departing from a scope of the testing apparatus 400. The description of the testing apparatus 400 is made with reference to the features shown in FIG. 1 for purposes of illustration and not of limitation.

The testing apparatus 400 may include a controller 104, an imager 108, an actuator 150, a memory 402, and a data store 404. The components of the testing apparatus 400 may include the same or similar features as the components of the testing apparatus 200. Accordingly, descriptions of the components in the testing apparatus 200 may apply to the components of the testing apparatus 400.

As shown in FIG. 4, the memory 402 has stored thereon machine-readable instructions 410-418 that the controller 104 is to execute. Although the instructions 410-418 are described herein as being stored on the memory 402 and thus include a set of machine-readable instructions, the testing apparatus 400 may include hardware logic blocks that may perform functions similar to the instructions 410-418. For instance, the controller 104 may include hardware components that may execute the instructions 410-418. In other examples, the testing apparatus 400 may include a combination of instructions and hardware logic blocks to implement or execute functions corresponding to the instructions 410-418. In any of these examples, the controller 104 may implement the hardware logic blocks and/or execute the instructions 410-418. As discussed herein, the testing apparatus 400 may also include additional instructions and/or hardware logic blocks such that the controller 104 may execute operations in addition to or in place of those discussed above with respect to FIG. 4.

The controller 104 may execute the instructions 410 to cause the illumination source 106 to output light through some of the optical components 110 and the objective lens 142 to the reflective surface 102. Light impinging on the reflective surface 102 may be reflected back through the objective lens 142 and some of the optical components 110 to the imager 108. In addition, a conjugate plane may be formed within the optical components 110 and may be propagated through the optical components 110 and onto the imager 108 as discussed herein.

The controller 104 may execute the instructions 412 to cause the conjugate plane to be moved among multiple locations within the optical components 110. In addition, at certain ones of the multiple locations, an image of a respective location within the optical components is focused at a conjugate plane that is aligned with an image sensor of the imager 108. The imager 108 may capture images of the locations at which the conjugate plane is formed and may forward the captured images to the controller 104.

The controller 104 may execute the instructions 414 to receive images of multiple optical components 110a, 110b from the imager 108.

The controller 104 may execute the instructions 416 to inspect the images of the multiple locations, in which the multiple locations may correspond to at least one of the optical components 110 in the optical system 100. The controller 104 may inspect the images in any of the manners discussed herein. The controller 104 may also execute the instructions 418 to output results of the inspection.

According to examples, the controller 104 may continuously receive images from the imager 108 as the conjugate plane is moved among the multiple locations. In these examples, the controller 104 may identify, from the received images, images of the optical components 110a, 110b focused at the conjugate plane that is aligned with the image sensor. In addition, the controller 104 may inspect the identified images of the optical components 110a, 110b. The controller 104 may also output an indication as to whether any of the inspected images of the optical components 110 identifies a potential issue.

According to examples, the controller 104 may determine, based on the inspection, that an image of a first optical component indicates that the first optical component includes a potential issue. In these examples, the controller 104 may determine a setting, e.g., a distance between the objective lens 142 and the reflective surface 102, a radius of curvature of the reflective surface 102, etc., at which the image of the first optical component was in focus at the conjugate plane that is aligned with the image sensor. In addition, the controller 104 may identify the first optical component based on a correlation between the determined distance and the first optical component. As discussed herein, the correlation may have previously been determined and stored, for instance, in the data store 404.

According to examples, the plurality of optical components 110 may include respective distinguishing marks that the controller 104 may use to identify the optical components 110. In these examples, the controller 104 may deter-mine, based on the inspection, that an image of a first optical component indicates that the first optical component includes a potential issue. In addition, the controller 104 may determine, from the distinguishing mark visible in the image of the first optical component, an identification of the first optical component.

As discussed herein, the testing apparatus 400 may be a testing apparatus of a device under test (DUT), which may be a terminating end of a fiber optic cable. In some examples, the reflective surface 102 may be replaced with a DUT and the controller 104 may execute an inspection of the DUT using the testing apparatus 400 following replacement of the reflective surface 102 with the DUT. In other examples in which the reflective surface 102 is part of a DUT or is the DUT, the controller 104 may execute an inspection of the DUT without first replacing the reflective surface 102.

Figure 5:
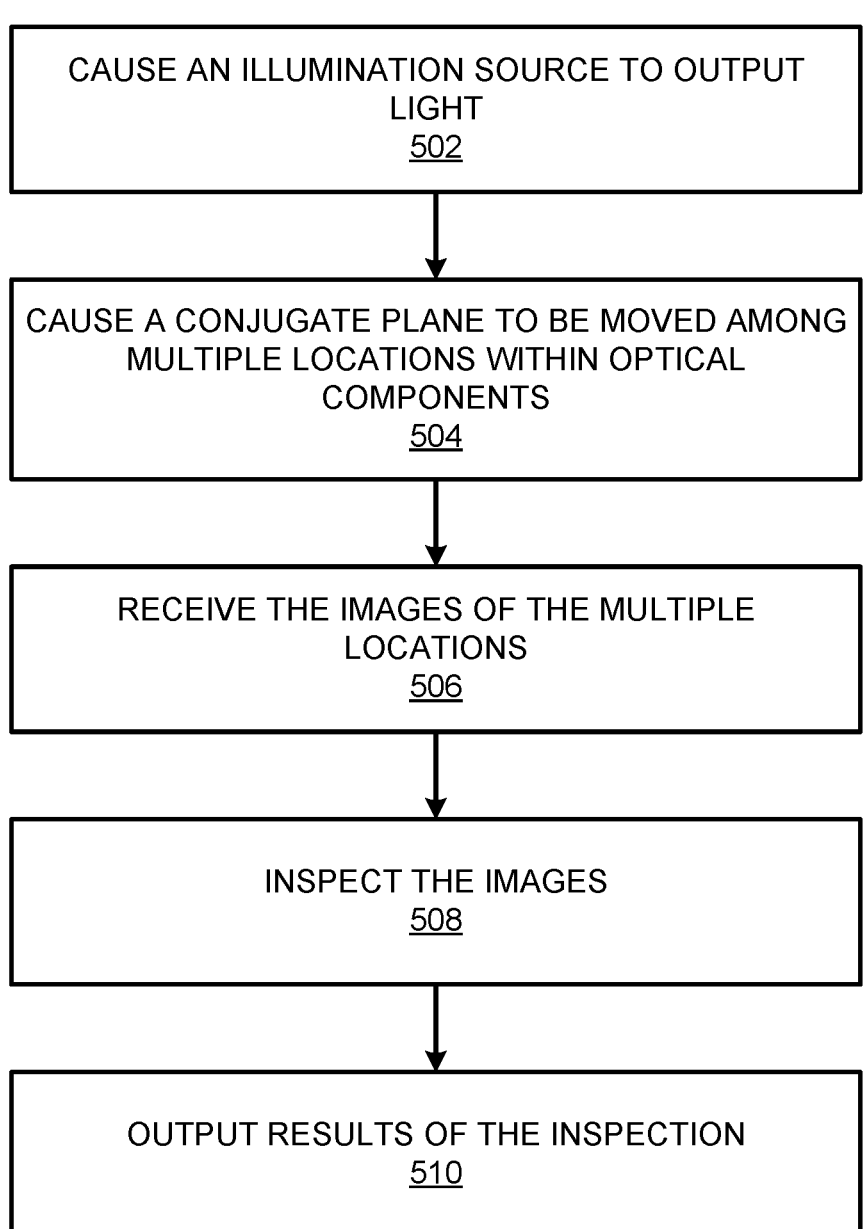
FIG. 5 illustrates a flow diagram of a method for inspecting optical components of an optical system, according to an example of the present disclosure.

Various manners in which the controller 104 may operate are discussed in greater detail with respect to the method 500 depicted in FIG. 5. Particularly, FIG. 5 illustrates a flow diagram of a method 500 for inspecting optical components 110 of an optical system 100, according to an example of the present disclosure. It should be understood that the method 500 may include additional operations and that some of the operations described therein may be removed and/or modified without departing from the scope of the method 500. The description of the method 500 is made with reference to the features depicted in FIGS. 1 and 4 for purposes of illustration.

At block 502, the controller 104 may cause the illumination source 106 to output light through some of the optical components 110 and the objective lens 142 to the reflective surface 102. Light impinging on the reflective surface 102 may be reflected back through the objective lens 142 and some of the optical components 110 to the imager 108. In addition, a conjugate plane may be formed within the optical components 110 and may be propagated through the optical components 110 and onto the imager 108 as discussed herein.

At block 504, the controller 104 may cause the conjugate plane to be moved among multiple locations within the optical components 110. In addition, at certain ones of the multiple locations, an image of a respective location within the optical components is focused at a conjugate plane that is aligned with an image sensor of the imager 108. The imager 108 may capture images of the locations at which the conjugate plane is formed and may forward the captured images to the controller 104.

At block 506, the controller 104 may receive images of multiple locations from the imager 108.

At block 508, the controller 104 may inspect the images of the multiple locations. In addition, at block 510, the controller 104 may output results of the inspection, for instance, to a user or technician. The controller 104 may output the results on a display, as part of a testing program, in an electronic communication, and/or the like.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. An optical system comprising:
a plurality of optical components including an objective lens;
an imager; and
a controller, wherein the controller is to:
cause a first conjugate plane to be formed on a first surface of a first optical component of the plurality of optical components, wherein an image of the first surface is reflected from a reflective surface onto the imager, and wherein the imager is to capture an image of the first surface at the first conjugate plane;
receive the captured image of the first surface at the first conjugate plane from the imager;
cause a second conjugate plane to be formed at a second location within the plurality of optical components, wherein the imager is to capture an image of the second location at the second conjugate plane, wherein the second location is on a second surface of the first optical component or a surface of a second optical component of the plurality of optical components; and
receive the captured image of the second location at the conjugate plane from the imager.

2. The optical system of claim 1, further comprising:
an illumination source, wherein the illumination source is to output light through some of the plurality of optical components and the objective lens to the reflective surface, wherein at least some of the light reflected from the reflective surface passes through some of the plurality of optical components and the objective lens to the imager.

3. The optical system of claim 1, wherein the controller is further to:
inspect the image of the first surface to identify potential issues with the first optical component; and
inspect the image of the second location to identify potential issues with the first optical component or the second optical component.

4. The optical system of claim 3, wherein the controller is further to:
output an indication as to whether either of the first optical component and the second optical component includes potential issues.

5. The optical system of claim 1, wherein the controller is to cause the first conjugate plane to be formed at the first surface through at least one of:
movement of the objective lens with respect to the reflective surface;
tuning of the objective lens to modify a focus of the objective lens;
movement of the reflective surface with respect to the objective lens; or
variance of a curvature of the reflective surface.

6. The optical system of claim 1, wherein the controller is to cause the first conjugate plane to be formed at the first surface through the reflective surface and the objective lens being at a first distance and the second conjugate plane to be formed at the second location through the reflective surface and the objective lens being at a second distance, and wherein the controller is further to:

determine, based on the first distance, an identity or a placement of the first surface within the plurality of optical components; and
determine, based on the second distance, an identity or a placement of the second location within the plurality of optical components.

7. The optical system of claim 6, wherein the controller is further to:
access correlations among distances between the objective lens and the reflective surface and identities or placements of the plurality of optical components within the optical system; and
determine the identities or placements of the first surface and the second location from the accessed correlations.

8. The optical system of claim 1, wherein the reflective surface comprises a curved surface and wherein the controller is to cause the first conjugate plane to be formed at the first surface through variance of a curvature of the reflective surface.

9. The optical system of claim 8, further comprising:
an actuator to at least one of:
change the curvature of the reflective surface; or
position one of a plurality of reflective surfaces having various radii of curvatures to reflect light through the objective lens.

10. A testing apparatus for inspecting a device under test, comprising:
a controller; and
a memory on which is stored machine-readable instructions that when executed by the controller, cause the controller to:
cause an illumination source to output light through optical components including an objective lens onto a reflective surface, wherein light reflected from the reflective surface is directed to an imager, and wherein a conjugate plane is formed within the optical components;
cause the conjugate plane to be moved among multiple locations within the optical components, wherein, at certain ones of the multiple locations, an image of a respective location within the optical components is focused at a conjugate plane that is aligned with an image sensor of the imager;
receive images of multiple locations from the imager; and
inspect the images of the multiple locations.

11. The testing apparatus of claim 10, wherein the instructions cause the controller to:
continuously receive images from the imager as the conjugate plane is moved among the multiple locations;
identify, from the received images, images of at least one optical component focused at the conjugate plane that is aligned with the image sensor; and
inspect the identified images of the at least one optical component.

12. The testing apparatus of claim 10, wherein the instructions cause the controller to:
determine, based on the inspection, that an image of a first optical component indicates that the first optical component includes a potential issue;
determine a setting at which the conjugate plane is at a location at which the image of the first optical component was in focus at the conjugate plane that is aligned with the image sensor; and
identify the first optical component based on a correlation between the determined setting and the location at which the image of the first optical component was in focus at the conjugate plane that is aligned with the image sensor.

13. The testing apparatus of claim 10, wherein a plurality of the optical components includes respective distinguishing marks, and wherein the instructions cause the controller to:

determine, based on the inspection, that an image of a first optical component indicates that the first optical component includes a potential issue; and determine, from the distinguishing mark visible in the image of the first optical component, an identification of the first optical component.

14. The testing apparatus of claim 10, wherein the instructions cause the controller to:

output an indication as to whether any of the inspected images of the optical components includes a potential issue.

15. The testing apparatus of claim 10, wherein the instructions cause the controller to:

execute an inspection of a device under test following replacement of the reflective surface with the device under test.

16. A method of inspecting optical components of an optical system, the method comprising:

causing, by a controller, light to be directed through optical components including an objective lens and onto a reflective surface, wherein light reflected from the reflective surface is directed through some of the optical components and onto an imager;

causing, by a controller, a first conjugate plane to be formed on a first surface of a first component of the optical components, wherein an image of a first surface is focused at a conjugate plane on the imager, and the imager is to capture an image of the first surface at the first conjugate plane;

receiving, by the controller, the captured image of the first surface from the imager;

causing, by the controller, a second conjugate plane to be formed at a second location within the optical components, wherein the imager is to capture an image of the second location at the second conjugate plane, wherein the second location is on a second surface of the first optical component or a surface of a second optical component of the optical components; and receiving, by the controller, the captured image of the second location from the imager.

17. The method of claim 16, further comprising:

inspecting the received image of the first surface of the first optical component to identify potential issues with the first optical component of the optical components; and inspecting the received image of the second location to identify potential issues with the first optical component or a second optical component.

18. The method of claim 16, wherein causing the first conjugate plane to be formed at the first surface comprises causing at least one of the optical components and the reflective surface to be at a first setting and wherein causing the second conjugate plane to be formed at the second location comprises causing at least one of the optical components and the reflective surface to be at a second setting, said method further comprising:

determining, based on the first setting, an identity or a placement of the first surface; and determining, based on the second setting, an identity or a placement of the second location.

19. The method of claim 18, further comprising:

accessing correlations among settings and identities or placements of the optical components within the optical system; and determining the identity or placement of the first surface and the second location from the accessed correlations.

20. The method of claim 16, further comprising:

causing the first conjugate plane to be formed at the first surface by at least one of:

causing the objective lens to be moved with respect to the reflective surface;

tuning of the objective lens to modify a focus of the objective lens;

causing the reflective surface to move with respect to the objective lens; or causing a curvature of the reflective surface to be varied.

* * * * *